United States Patent [19]
Ogle, Jr.

[11] 3,794,716
[45] Feb. 26, 1974

[54] SEPARATION OF URANIUM ISOTOPES BY CHEMICAL EXCHANGE
[75] Inventor: Pearl R. Ogle, Jr., Westerville, Ohio
[73] Assignee: The United States of America as represented by the United States Atomic Energy Commission, Washington, D.C.
[22] Filed: Sept. 13, 1972
[21] Appl. No.: 288,860

[52] U.S. Cl............ 423/253, 423/258, 252/301.1 R
[51] Int. Cl............................................. C01g 43/00
[58] Field of Search....... 423/253, 258; 252/301.1 R

[56] References Cited
UNITED STATES PATENTS
3,697,235  10/1972  Ogle............................... 423/253 X
3,039,846  6/1962  Ogle................................... 423/253

Primary Examiner—Carl D. Quarforth
Assistant Examiner—R. L. Tate
Attorney, Agent, or Firm—Roland A. Anderson; John A. Horan; Irving Barrack

[57] ABSTRACT

A chemical exchange method is provided for separating uranium-235 from uranium-238 comprising contacting a first phase containing $UF_6$ with a second phase containing a compound selected from the group consisting of $NOUF_6$, $NOUF_7$, and $NO_2UF_7$ until the $UF_6$ in the first phase becomes enriched in the U-235 isotope.

12 Claims, 2 Drawing Figures

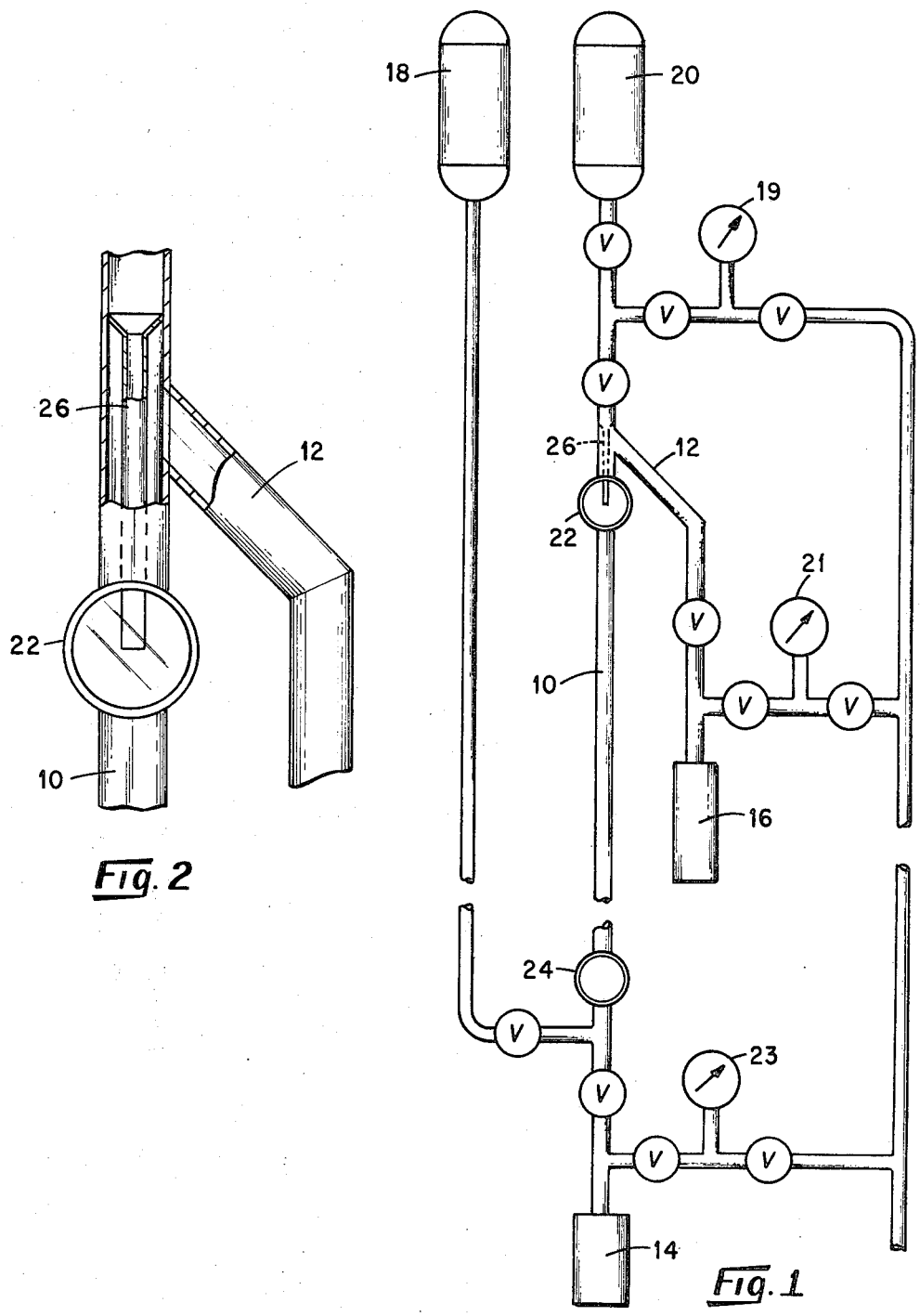

SEPARATION OF URANIUM ISOTOPES BY CHEMICAL EXCHANGE

BACKGROUND OF THE INVENTION

The present invention relates to a process for the separation of uranium isotopes by chemical exchange. It was made in the course of, or under, a contract with the U. S. Atomic Energy Commission.

Separation of isotopes by a chemical separation scheme allows for the possibility of large economic savings since it represents a reversible isotope exchange process requiring a much smaller expenditure of power as compared to an irreversible process such as is required in gaseous diffusion processes.

BRIEF DESCRIPTION OF THE DRAWING

In the drawing FIG. 1 is a diagramatic representation of a system for carrying out this isotopic exchange process, and FIG. 2 presents details of a portion of the system for monitoring its operation.

DESCRIPTION OF THE INVENTION

The present invention is based on the discovery that, when a first phase containing a $UF_6$ complex compound represented by the general formula $M_m(UF_n)$, alone or dissolved in a fluoride-containing solvent is contacted with a second phase immiscible with said first phase and containing gaseous or liquid $UF_6$ alone or dissolved in a perhalogenated solvent, the $UF_6$ phase will become enriched in the uranium-235 isotope. M represents a univalent positive metal ion or radical which is associated with the $UF_n^{-m}$ or uranium-bearing complex fluoride anion of charge m. In general, the number n of fluoride ions F and the valence state of the uranium atom will determine the charge m and hence the formula of the resulting $UF_6$ complex salt. Examples of compounds represented by $M_m(UF_n)$ include $NOUF_6$ ($M = NO^+$, $n = 6$, $m = 1$), $NOUF_7$ ($M = NO^+$, $n = 7$, $m = 1$), and $NO_2UF_7$ ($M = NO_2^+$, $n = 7$, $m = 1$). Thus, when a first phase containing a solid compound selected from the group consisting essentially of $NOUF_6$, $NOUF_7$, and $NO_2UF_7$ alone or dissolved in a fluoride-ion-containing solvent is contacted with a second phase containing gaseous or liquid $UF_6$ alone or dissolved in a perhalogenated solvent, the second $UF_6$-containing phase will become enriched in the uranium-235 isotope. In order to achieve enrichment, the two phases undergoing isotopic exchange must satisfy certain basic requirements which are delineated below.

1. The two phases must be stable, not only with respect to each other but the substances used in contacting them. In that sense, the present invention can be represented by the following two-phase systems which I have found to undergo isotopic exchange and which are compatible and separable without adverse chemical reaction.

| First Phase | Second Phase |
|---|---|
| A. $NOUF_6$(s) | $UF_6$ (l) or (g) |
| B. $NOUF_7$(s) | $UF_6$ (l) or (g) |
| C. $NO_2UF_7$(s) | $UF_6$ (l) or (g) |
| D. $NOUF_6$(s) | $UF_6$ (l) or (g) − HF(g) |
| E. $NOUF_6$ in HF:$UF_6$ in perfluorotributylamine (FC-43) | |
| F. $NOUF_6$ in HF:$UF_6$ in trichlorotrifluoroethane (F-113) | |
| G. $NOUF_6$ in HF:$UF_6$ in dichlorotetrafluoroethane (F-114) | |
| H. $UF_6$ in HF:$UF_6$ in FC-43 | |
| I. $UF_6$ in HF:$UF_6$ in F-114 | | where (s) = solid, (l) = liquid, and (g) = gas.

2. The equilibrium constant established between the two phases of A-I, inclusive, is greater than unity where the equilibrium constant, or single stage separation factor, $\alpha$, is defined as

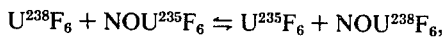

where
[U-235]/[U-238]$_e$ = the uranium-235-to-uranium-238 mole ratio in the U-235 enriched phase, and
[U-235]/[U-238]$_d$ = the uranium-235-to-uranium-238 mole ratio in the U-235 depleted phase.

Isotopic concentrations were obtained by mass spectrometry using the standard technique described in TID-7029, a publication of the U. S. Atomic Energy Commission entitled "Selected Measurement Methods for Plutonium and Uranium in the Nuclear Fuel Cycle" by R. J. Jones (1963).

Isotopic exchange to give an $\alpha$ greater than unity occurs in each of reactions A-I, inclusive, but the greatest value was found to occur between the uranium compounds $NOUF_6 + UF_6$. Thus, systems A, D, E, F, and G involve the same exchange reaction; i.e.,

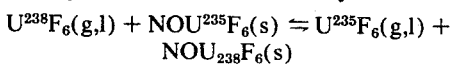

where the U-235 enrichment occurs in the $UF_6$.

3. The rate of isotopic exchange must be very rapid since this rate determines the time required to reach equilibrium. System A was studied by various temperatures. Known amounts of the two components were added to a nickel reactor and left at a designated temperature for a desired length of time. The reactor was then quickly cooled to room temperature in order to freeze the exchange reaction and a portion of the $UF_6$ was removed for mass spectrometer analysis. The amount of $UF_6$ removed from the reactor was noted and a new $UF_6/NOUF_6$ mole ratio was determined. The procedure was repeated at several temperatures and the results for runs at temperatures in the range 25° to 190° C. are shown in Table I.

TABLE I

Determination of Single Stage Uranium Isotopic Separation Factors for the System:

$$U^{238}F_6(g,l) + NOU^{235}F_6(s) \rightleftharpoons U^{235}F_6(g,l) + NOU_{238}F_6(s)$$

at Various Temperatures

| Temp., °C. | Contact Time | Mole Ratio $UF_6/NOUF_6$ | $\alpha$ |
|---|---|---|---|
| 25 | 7 days | 0.853 | 1.00002 |
|  | 13 days | 0.747 | 1.00010 |
|  | 37 days | 0.571 | 0.99998 |
|  | 79 days | 0.481 | 0.99998 |
|  | 120 days | 0.390 | 1.00000 |
| 75 | 2 hours | 0.682 | 1.00000 |
|  | 4 hours | 0.924 | 1.00000 |
|  | 21 hours | 0.668 | 1.00017 |
|  | 64 hours | 0.595 | 1.00051 |
|  | 64 hours | 1.057 | 1.00053 |
|  | 64 hours | 3.571 | 1.00073 |
| 85 | 2 hours | 0.914 | 1.00000 |
|  | 4 hours | 1.053 | 1.00000 |
|  | 4 hours | 1.311 | 1.00000 |
|  | 8 hours | 0.834 | 1.00000 |
|  | 16 hours | 0.795 | 1.00000 |

| | | |
|---|---|---|
| 16 hours | 2.345 | 1.00000 |
| 64 hours | 0.846 | 1.00037 |
| 64 hours | 0.054 | 1.00046 |
| 120 hours | 0.356 | — |
| 120 hours | 0.028 | 1.00076 |
| 144 hours | 0.062 | 1.00079 |
| 153 | | |
| 16 hours | 1.156 | 1.00045 |
| 16 hours | 0.0007 | 1.00042 |
| 16 hours | 2.264 | 1.00000 |
| 24 hours | 0.882 | 1.00030 |
| 80 hours | 0.086 | 1.00068 |
| 88 hours | 0.730 | 1.00033 |
| 130 hours | 0.077 | 1.00065 |
| 226 hours | 0.067 | 1.00069 |
| 232 hours | 0.681 | 1.00029 |
| 190 | | |
| 16 hours | 0.437 | 1.00030 |
| 33 hours | 0.349 | 1.00042 |
| 81 hours | 0.292 | 1.00063 |
| 225 hours | 0.257 | 1.00047 |

The results indicate that at temperatures above 25° C. exchange occurred, increasing with time for a given temperature, and reached a maximum at 85° C. However, the equilibrium constant decreased with increasing temperature and required a fairly long time to establish.

The Effect of HF

A surprising and unexpectedly favorable decrease in time and temperature necessary to establish exchange was discovered when HF was included a third component. This is illustrated in results found for system D as given in Table II.

TABLE II

Single Stage Separation Factor ($\alpha$) for the System:

$NOUF_6(s):UF_6(g):HF(g)$

| At 25°C. Contact Time, hr. | Mole Ratio, $NOUF_6:UF_6:HF$ | $\alpha$ |
|---|---|---|
| 0.5 | 1:0.79230:24.79 | 1.00094 |
| 2 | 1:2.02687:156.15 | 1.00121 |
| 2 | 1:1.00288:26.19 | 1.00066 |
| 2 | 1:0.99587:63.41 | 1.00088 |
| 40 | 1:1.6788:36.61 | 1.00090 |
| 190 | 1:0.89323:3.97 | 1.00080 |
| 190 | 1:2.73787:8.02 | 1.00090 |
| 240 | 1:1.20378:101.80 | 1.00076 |
| 240 | 1:0.82016:12.75 | 1.00141 |
| 312 | 1:0.76271:112.72 | 1.00086 |
| 456 | 1:0.99917:76.25 | 1.00118 |

It will be noted that the addition of hydrogen fluoride to the $UF_6$-$NOUF_6$ mixture produced exchange at 25° C. The magnitude of the exchange was nearly as large in 0.5 hour as at the end of 456 hours, indicating that the presence of HF materially reduced the time necessary to establish the equilibrium concentration. Hydrogen fluoride was found to exhibit similar effects on the other listed $UF_6$-$NOUF_6$ systems but had no effect on systems B and C.

Cascading Effect — The Best Mode

The best mode of practicing this invention is by counter-currently contacting the $UF_6$ phase and a $NOUF_6$ phase in a column between a first liquid phase containing $NOUF_6$ dissolved in a suitable solvent that is stable toward and does not appreciably dissolve $UF_6$ and a second liquid phase of $UF_6$ dissolved in a stable inert solvent immiscible with and having an appreciably different density than the solvent for $NOUF_6$ in order to cascade the single stage operation. Systems E-I, inclusive, are examples of liquid-liquid reversible chemical exchange between the designated phases. Thus, when the four components $NOUF_6$, HF, $UF_6$, and any one of the designated fluorocarbons are mixed, two phases result which are immiscible. The heavy phase (H.P.) is predominantly fluorocarbon and $UF_6$, while the light phase (L.P.) is predominantly hydrogen fluoride and $NOUF_6$. System E was used to determine that the equilibrium concentration for reaction, as represented by the preceding equation, was established within a few minutes. System G was used to cascade the single stage enrichment by flowing the heavy phase downwardly in dropwise fashion through a static column of $NOUF_6$ in HF.F-114 is the preferred fluorocarbon because of the greater solubility of $UF_6$ in that solvent. Table III below presents the $UF_6$ distribution coefficient (D.C.) for system G.

TABLE III

Distribution Coefficient of $UF_6$* Between Freon-114 (Heavy Phase) and Liquid HF (Light Phase)

| Conc. $UF_6$ (g/g) | | Distribution Coefficient = g $UF_{6/g}$ Freon-114/g $UF_{6/g}$ Liquid HF |
|---|---|---|
| in Freon-114 | in Liquid HF | |
| 0.2488 | 0.0583 | 4.268 |
| 0.4400 | 0.997 | 4.413 |
| 0.4550 | 0.1109 | 4.103 |
| 0.4827 | 0.1147 | 4.208 |
| 0.4903 | 0.1574 | 3.115 |

*The weight ratios of $NOUF_6$/HF in the five tests were between 0.70 and 0.77.

Systems H and I were used to determine the distribution of $UF_6$ between the fluorocarbon and HF and the degree of isotopic enrichment. The data obtained for system H are summarized in Table IV below.

TABLE IV

Distribution Data of System H at 25° C.

| Conc. $UF_6$ (H.P.) / Conc. $UF_6$ (L.P.) | Mole fraction | | | G. $UF_6$/ g. L.P. | G. $UF_6$/ g. H.P. | $\alpha$ |
|---|---|---|---|---|---|---|
| | $UF_6$ | FC-43 | HF | | | |
| 1.248 | 1.6 | 3.0 | 95.4 | .125 | .156 | 1.00025 |
| 1.037 | 1.9 | 3.0 | 95.1 | .612 | .168 | |
| 0.838 | 2.1 | 3.0 | 94.9 | .203 | .170 | 1.00017 |
| 1.269 | 2.3 | 3.0 | 94.7 | .178 | .226 | |
| 1.038 | 2.4 | 3.0 | 94.6 | .211 | .219 | 1.00014 |
| 0.605 | 2.7 | 3.0 | 94.3 | .296 | .179 | 1.00022 |

The data show enrichment occurred in the heavy (fluorocarbon) phase. The values of $\alpha$ for system I averaged only 1.00007.

Representative Embodiment of Best Mode

System G ($NOUF_6$ in HF and $UF_6$ in F-114) was used to operate an isotopic exchange process in the countercurrent contact mode. The contacting equipment, as shown in FIG. 1, comprised a column made of one-fourth-inch schedule 40 monel pipe 10 with a contact length of about 17 feet with a side arm 12 near the top end of the pipe. The bottom end of the pipe and the side arm terminated in fluorethene receivers 14 and 16 for emptying the contacted heavy and light phases, respectively. Feed cylinders 18 and 20 served as sources for the light phase and heavy phase, respectively. The equipment included associated piping valves, unnumbered, and pressure gauges 19, 21, and 23 as shown in FIG. 1. Sight glass bodies 22 and 24 were welded into the column 10 to permit observance of fluid flow.

Lights behind the translucent fluorethene receivers permit visibility of liquid levels. Visibility was enhanced because the blue-green color of the light phase contrasted sharply with the water-clear heavy phase. To operate the equipment, column 10 was first filled with the light phase material through the light phase feed line to a level just below the side arm 12. Heavy phase material was added in discrete droplets from a tube 26 submerged beneath the surface of the light phase liquid. As shown more clearly in FIG. 2, the end of the tube was located at sight glass 22 so that droplet formation and rate of addition could be monitored. As the heavy phase was added, it displaced an equal volume of light phase material from column 10 into side arm 12. When the desired quantity of heavy phase material was dropped through the light phase, it was discharged to the heavy phase receiver 14. Both receivers were frozen and removed and replaced by fresh receivers. Finally, fresh light phase liquid was introduced into column 10 so that it was raised to its original level at the side arm, and the system was ready for the next run.

Heavy phase and light phase feed solutions were made from the same source of $UF_6$ so that they both initially had the same isotopic concentration. A total of 25 runs were made in the manner described and analyzed for isotopic concentration.

The isotopic analysis was made by comparing the ratio of isotopes in the sample to the ratio of isotopes in the original material (which was used as a standard) on a mass spectrometer to ascertain a ratio R, where $$R = U\text{-}235/U\text{-}238 \text{ (of sample)}/U\text{-}235/U\text{-}238 \text{ (of standard)}.$$

Enrichment in the U-235 isotope is indicated by a value of R greater than 1, depletion in the U-235 isotope by a ratio less than 1, and no enrichment or depletion by a ratio of 1. It was found that the U-235 isotope concentrated in the heavy phase. A summary of analytical results for selected runs is given in Table V.

TABLE V

Analytical Results of Initial Column Operation at 25°C.

| | [U-235/U-238 (sample)]/[U-235/U-238 (standard)] | | |
|---|---|---|---|
| Run No. | Heavy Phase Ratio | Light Phase Ratio | Heavy to Light Phase Ratio |
| 2 | 1.00113 | 0.99999 | 1.00113 |
| 5 | 1.00118 | 0.99992 | 1.00126 |
| 10 | 1.00108 | 0.99966 | 1.00142 |
| 15 | — | 0.99938 | 1.00211 |
| 20 | — | — | 1.00180 |
| 25 | — | — | 1.00209 |

Actual contact of the heavy and light phases was on the order of seconds, indicating rapid attainment of enrichment.

Column Operation with Reflux

Reflux, in connection with chemical exchange, refers to the chemical conversion of one species into the other and the return of the converted species to undergo further exchange. Specifically, reflux refers to the conversion of $UF_6$ to $NOUF_6$ at one end of the column and conversion of $NOUF_6$ to $UF_6$ at the other end of the column and represents the most practical embodiment of the best mode for large-scale production of a U-235 enriched product.

Conversion of U-235-enriched $UF_6$ in the heavy phase occurs by adding 35 to 50 percent excess NO to the contacted heavy phase and heating with agitation at a temperature in the range 25° to 100° C. After cooling, the Freon-114 (F-114) and excess NO is pumped off, HF added to the $NOUF_6$ and mixed sufficiently to effect solution of the HF. The resulting solution now serves as a new feed supply for a succeeding cycle of operation. Thus, the new feed material contained the converted heavy phase material from the previous cycle.

Conversion of the $NOUF_6$-containing light phase is accomplished by addition of $F_2$ or $ClF_3$ to the $NOUF_6$-HF mixture at a temperature in the range 25° to 40° C. Of the two fluorinating agents, $ClF_3$ is preferred and, when used, requires a $ClF_3/NOUF_6$ mole ratio of at least 2 to obtain good conversion. The $NOUF_6$ dissolved in HF produces a blue-green solution which turns to a light yellow to colorless solution upon addition of either fluorinating agent. The $UF_6$ is then recovered by extraction with F-113, F-114, or FC-43 to form a new heavy phase for recycling back to the column.

Thus we have described a chemical exchange process with interconversion of each species to the other as it issues from the exchange region.

What is claimed is:

1. A method for separating uranium-235 from uranium-238 comprising contacting a first gaseous or liquid phase containing $UF_6$ with a second liquid or solid phase containing a compound selected from the group consisting of $NOUF_6$, $NOUF_7$, and $NO_2UF_7$ until the $UF_6$ in the first phase becomes enriched in the U-235 isotope.

2. The method according to claim 1 wherein the first and second phases are selected from the group consisting of First Phase      Second Phase A. $NOUF_6(s)$ : $UF_6$ (1) or (g)
   B. $NOUF_7(s)$ : $UF_6$ (1) or (g)
   C. $NO_2UF_7(s)$ : $UF_6$ (1) or (g)
   D. $NOUF_6(s)$ : $UF_6$ (1) or (g) − HF(g)
   E. $NOUF_6$ in HF : $UF_6$ in perfluorotributylamine
   F. $NOUF_6$ in HF : $UF_6$ in trichlorotrifluoroethane
   G. $NOUF_6$ in HF : $UF_6$ in dichlorotetrafluoroethane
   where (s) = solid, (1) = liquid, and (g) = gas.

3. A method for separating U-235 and U-238 which comprises countercurrently contacting a first liquid phase consisting essentially of $UF_6$ dissolved in a liquid fluorinated hydrocarbon which is essentially immiscible with HF and a second phase consisting essentially of $NOUF_6$ dissolved in HF until the $UF_6$ becomes enriched in the U-235 isotope.

4. The method according to claim 3 in which the solvent for $UF_6$ is selected from the group consisting of trichlorotrifluoroethane, dichlorotetrafluoroethane, and perfluorotributylamine.

5. A method of separating U-235 from U-238 comprising countercurrently contacting a first liquid phase consisting essentially of $UF_6$ dissolved in an essentially HF-immiscible liquid fluorinated hydrocarbon with a second phase having a lower specific gravity than said first phase and consisting essentially of $NOUF_6$ dissolved in HF until the $UF_6$ becomes enriched in the U-235 isotope.

6. The method according to claim 5 in which droplets of the heavier phase are passed through a column containing the lighter phase.

7. The method according to claim 5 in which droplets of the heavier phase are passed through a column filled with the lighter phase to displace the lighter phase in said column.

8. The method according to claim 5 in which the HF-immiscible solvent for $UF_6$ is a fluorinated hydrocarbon.

9. A method of separating U-235 from U-238 comprising countercurrently contacting a first liquid phase consisting essentially of $UF_6$ dissolved in an essentially HF-immiscible liquid florinated hydrocarbon with a second phase having a lower specific gravity than said first phase and consisting essentially of $NOUF_6$ dissolved in HF until the $UF_6$ becomes enriched in the U-235 isotope, reacting the contacted $\overline{NOUF_6}$ with $\overline{F_2}$ or $ClF_3$ to form $UF_6$ and cycling back the thus produced $UF_6$ to serve as solute for the first liquid phase.

10. The process according to claim 9 in which $UF_6$ previously enriched in U-235 is reacted with NO to form $NOUF_6$ to serve as solute for the second liquid phase.

11. The method according to claim 9 in which the contacted $NOUF_6$ phase, after disengagement from the $UF_6$-containing phase, is reacted with a fluorinating agent selected from the group consisting of $F_2$ or $ClF_3$ to produce $UF_6$ to serve as solute for the first liquid phase.

12. The method according to claim 10 in which $UF_6$ previously enriched in U-235 is disengaged from the lighter phase and reacted with NO to produce $NOUF_6$, separating the resulting $NOUF_6$ and reconstituting it with HF to serve as the second liquid phase.

* * * * *